(12) United States Patent
Maeda et al.

(10) Patent No.: US 11,349,324 B2
(45) Date of Patent: May 31, 2022

(54) SYSTEMS AND METHODS FOR PROVIDING A PERSONALIZED CHARGING RATE

(71) Applicant: Honda Motor Co., Ltd., Tokyo (JP)

(72) Inventors: Eri Izumi Maeda, Rancho Palos Verdes, CA (US); David Wong Cun, Fountain Valley, CA (US); Harold Michael Koenig, Redondo Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 75 days.

(21) Appl. No.: 16/813,057

(22) Filed: Mar. 9, 2020

(65) Prior Publication Data

US 2021/0281096 A1    Sep. 9, 2021

(51) Int. Cl.
*H02J 7/00* (2006.01)
*B60L 53/66* (2019.01)
*B60L 53/65* (2019.01)

(52) U.S. Cl.
CPC ............ *H02J 7/0071* (2020.01); *B60L 53/65* (2019.02); *B60L 53/66* (2019.02)

(58) Field of Classification Search
None
See application file for complete search history.

(56) References Cited

U.S. PATENT DOCUMENTS

| | | | |
|---|---|---|---|
| 2010/0013434 A1* | 1/2010 | Taylor-Haw | G06Q 20/127 320/109 |
| 2010/0017249 A1* | 1/2010 | Fincham | B60L 53/665 705/412 |
| 2012/0245750 A1* | 9/2012 | Paul | B60L 53/65 700/291 |
| 2013/0307475 A1* | 11/2013 | Kishiyama | H02J 7/00712 320/109 |

* cited by examiner

*Primary Examiner* — David V Henze-Gongola
(74) *Attorney, Agent, or Firm* — Rankin, Hill & Clark LLP (57) ABSTRACT

Systems and methods for providing a personalized charging rate are provided. In one embodiment, a system may include a recognition module, a schedule module, a charge rate module, and a charging module. The recognition module is configured to identify a vehicle to receive a charge from a charging station. The schedule module is configured to determine a parked period when the vehicle will be present at the charging station based on a schedule. The charge rate module is configured to calculate a personalized charging rate based on the parked period. The charge rate defines a charge period that is an amount of time that the charging station will provide charge to the vehicle. The personalized charging rate is calculated to reduce a time difference between the parked period and the charge period. The charging module is configured to set the personalized charging rate.

14 Claims, 5 Drawing Sheets

SYSTEMS AND METHODS FOR PROVIDING A PERSONALIZED CHARGING RATE

BACKGROUND

Increasingly, vehicles are designed to be recharged using charging stations. For example, electric vehicles use an electric motor to provide all or part of the mechanical drive power of the vehicle. Some types of electric vehicle can be charged from an external source via a charging station. A plugin electric vehicle may include batteries which store power from the electric grid in an electrochemical cell. To facilitate charging of electric vehicles, charging stations are often positioned in parking structures and lots. While the number of available charging stations is increasing, typically, a parking lot or structure will only have a few parking spots that can access the charging stations.

BRIEF DESCRIPTION

According to one aspect, a system for providing a personalized charging rate is provided. The system includes a recognition module, a schedule module, a charge rate module, and a charging module. The recognition module is configured to identify a vehicle to receive a charge. A number of charging parameters associated with the vehicle receiving a charge from a charging station. The schedule module is configured to determine a parked period when the vehicle will be present at the charging station based on a schedule associated with the vehicle. The charge rate module is configured to calculate a personalized charging rate based on the charging parameters and the parked period. The charge rate defines a charge period that is an amount of time that the charging station will provide charge to the vehicle to increase a charge level of the vehicle to a predetermined level. The personalized charging rate is calculated to reduce a time difference between the parked period and the charge period. The charging module is configured to set the personalized charging rate for the charging station.

According to another aspect, a method for providing a personalized charging rate is provided. The method includes identifying a vehicle to receive a charge. A number of charging parameters associated with the vehicle receiving a charge from a charging station. The method also includes determining a parked period when the vehicle will be present at the charging station based on a schedule associated with the vehicle. The method further includes calculating a personalized charging rate based on the charging parameters and the parked period. The charge rate defines a charge period that is an amount of time that the charging station will provide charge to the vehicle to increase a charge level of the vehicle to a predetermined level. The personalized charging rate is calculated to reduce a time difference between the parked period and the charge period. The method yet further includes setting the personalized charging rate.

According to a further aspect, a non-transitory computer readable storage medium storing instructions that when executed by a computer, which includes a processor to perform a method for providing a personalized charging rate. The method including identifying a vehicle to receive a charge. A number of charging parameters associated with the vehicle receiving a charge from a charging station. The method also includes determining a parked period when the vehicle will be present at the charging station based on a schedule associated with the vehicle. The method further includes calculating a personalized charging rate based on the charging parameters and the parked period. The charge rate defines a charge period that is an amount of time that the charging station will provide charge to the vehicle to increase a charge level of the vehicle to a predetermined level. The personalized charging rate is calculated to reduce a time difference between the parked period and the charge period. The method yet further includes setting the personalized charging rate for the charging station.

DETAILED DESCRIPTION

As discussed above, users may have to wait to access public charging stations for their vehicle. Furthermore, a vehicle may occupy a charging station even after it has received a full charge. Suppose that a user is visiting a theme park. The user may park their vehicle at a charging station because charging stations are typically located in preferred parking spaces, for example, near the theme park entrance. While the vehicle may only be charged for two hours at a standard charging rate, the vehicle may occupy the parking space associated with the charging station for eight hours while the user is in the theme park. However other vehicles may not be able to access the charging station to receive a charge while the previously parked vehicle is sitting in the parking space not receiving a charge. Therefore, some charging stations have implemented an idle penalty for vehicles that occupy the parking space associated with the charging station when not receiving a charge.

The systems and methods described herein provide a personalized charging rate for the user in order to accommodate the user's schedule. Charging stations may provide different charging options. The personalized charging rate may be associated with a charging option that provides the vehicle with the desired charge while avoiding any penalties. Continuing the example from above, a personalized charging rate may be used to charge the vehicle more slowly so that it takes longer to charge the vehicle if the user plans to spend a longer time in the theme park. In particular, the personalized charging rate be calculated so that it takes approximately eight hours to charge the vehicle rather than two hours. Thus, the personalized charging rate can be calculated to charge the vehicle in a manner that comports with the schedule associated with the vehicle and/or the user. Moreover, because the vehicle would be charging for an amount of time corresponding to the length of time that user plans to be away, the user may avoid incurring idle penalties.

Definitions

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Charging station," as used here, refers to an access point to an energy source that a vehicle can engage to receive a charge. Accordingly, the charging station is an element in an energy infrastructure capable of transferring energy, for example, from the grid to a vehicle. The charging station may include a connector to connect to the vehicle to the charging station. For example, the charge connector may include a range of heavy duty or special connectors that conform to the variety of standards, such as DC rapid charging, multi-standard chargers, and AC fast charging, etc.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Station systems," as used herein can include, but is not limited to, any system that can be used to enhance the charge capability, use, and/or safety of a charging station. Exemplary station systems include, but are not limited to: a monitoring system, a vehicle identification system, a user detection system, communication system, a charge allocation system, a charge management system, a scheduling system, a sensory system, and a camera system among others.

A "user," as used herein can include, but is not limited to, one or more biological beings exerting a demand on a source of energy, such as an electrical grid. The user can be a driver or a passenger of a vehicle.

"Value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle powered wholly or partially by any form of rechargeable energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle. The autonomous vehicle can carry one or more users. Further, the term "vehicle" can include vehicles that are automated or non-automated with predetermined paths or free-moving vehicles.

I. Systems Overview

Figure 1:
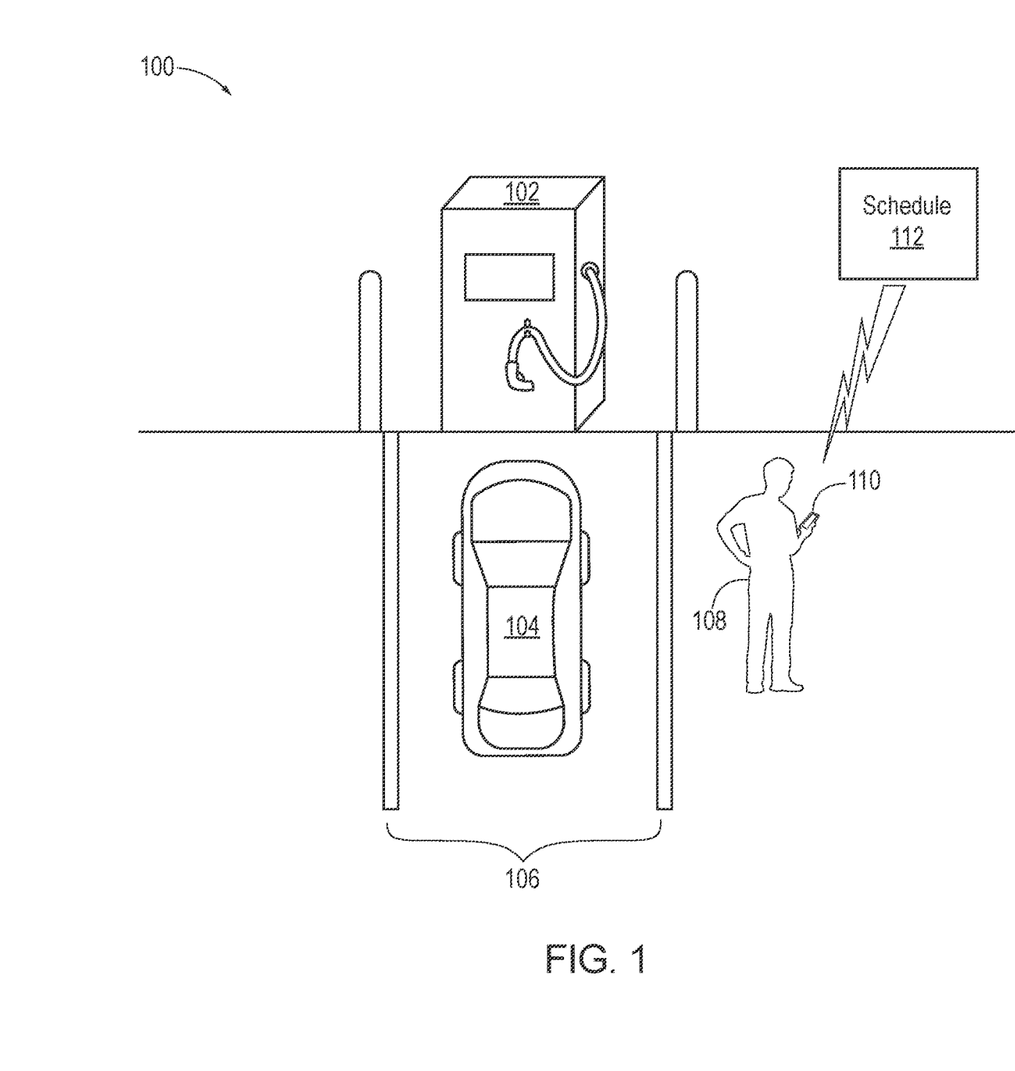
FIG. 1 is a schematic view of an exemplary parking area having a charging station, according to one embodiment.

Referring now to the drawings, the showings are for purposes of illustrating one or more exemplary embodiments and not for purposes of limiting the same. FIG. 1 is a parking area 100 including the charging station 102. The charging station 102 provides energy to vehicles, such as the vehicle 104, here shown in parking space 106. Here, the charging station 102 is specifically associated with the parking space 106. However, the charging station 102 may be associated with a plurality of parking spaces.

In one or more embodiments, the charging station 102 may include charging equipment that may be installed in a private or public location for example, at a public (e.g., non-networked) or private (e.g., networked) charging station(s). The charging station 102 may include a charging station identification designation (e.g., identification number, serial number, alpha-numeric code, station name) that may be used to identify a particular charging stations. The charging station 102 may replenish the vehicle 104 using a charging energy source type that indicates the type of energy the charging station 102 provides. Energy may include clean renewable energy and non-renewable energy. Clean renewable energy may include, solar energy, hydro energy, biomass energy, wind energy, among others. Non-renewable energy may include electricity from a grid source supplied by one or more utility providers, and in the case of hybrid vehicles, fossil fuels.

In one or more configurations, the vehicle 104 may be capable of being fast charged based on fast charging components (not shown) that may be operably connected to the vehicle 104. Fast charging may enable the vehicle 104 to be charged at one or more charging speed tiers that provide a higher charging power (e.g., voltage, power, etc.) than a default charging speed tier or a slower charging speed tier. In some cases, the charging station 102 may include fast charging electric charging equipment (not shown) that may be facilitate the charging of the vehicle 104 at the one or more charging speed tiers.

In particular, the charging station 102 may provide one or more charging speed tiers that provide a default charging speed (e.g., where a default amount of charging power is provided to charge the vehicle 104 at a default charging speed) and/or one or more levels of fast charging speeds at one or more charging voltages. For example, one or more fast charging speed tiers may provide one or more levels of fast charging from a default charging speed tier or one or more slower charging speed tiers that may provide slower charging at one or more lower charging voltages (e.g., increase from 240 volts to 480 volts) to more quickly charge the vehicle 104 to a particular desired state of charge level (SOC). Accordingly, during utilization of one or more slower and/or faster charging speed tiers.

In some embodiments, a user 108, associated with the vehicle 104, may also occupy the parking area 100. The user 108 user may be a vehicle occupant of the vehicle 104. In another embodiment, the user 108 may be remotely located from the vehicle 104. For example, the vehicle 104 may have autonomously driven to the parking area 100 while the user 108 remains at a distant location, such as a residence (not shown). The user 108 may also have a portable device 110, such as a phone. The user 108 may transmit a schedule 112 associated with the vehicle 104 via, for example, the portable device 110.

Figure 2:
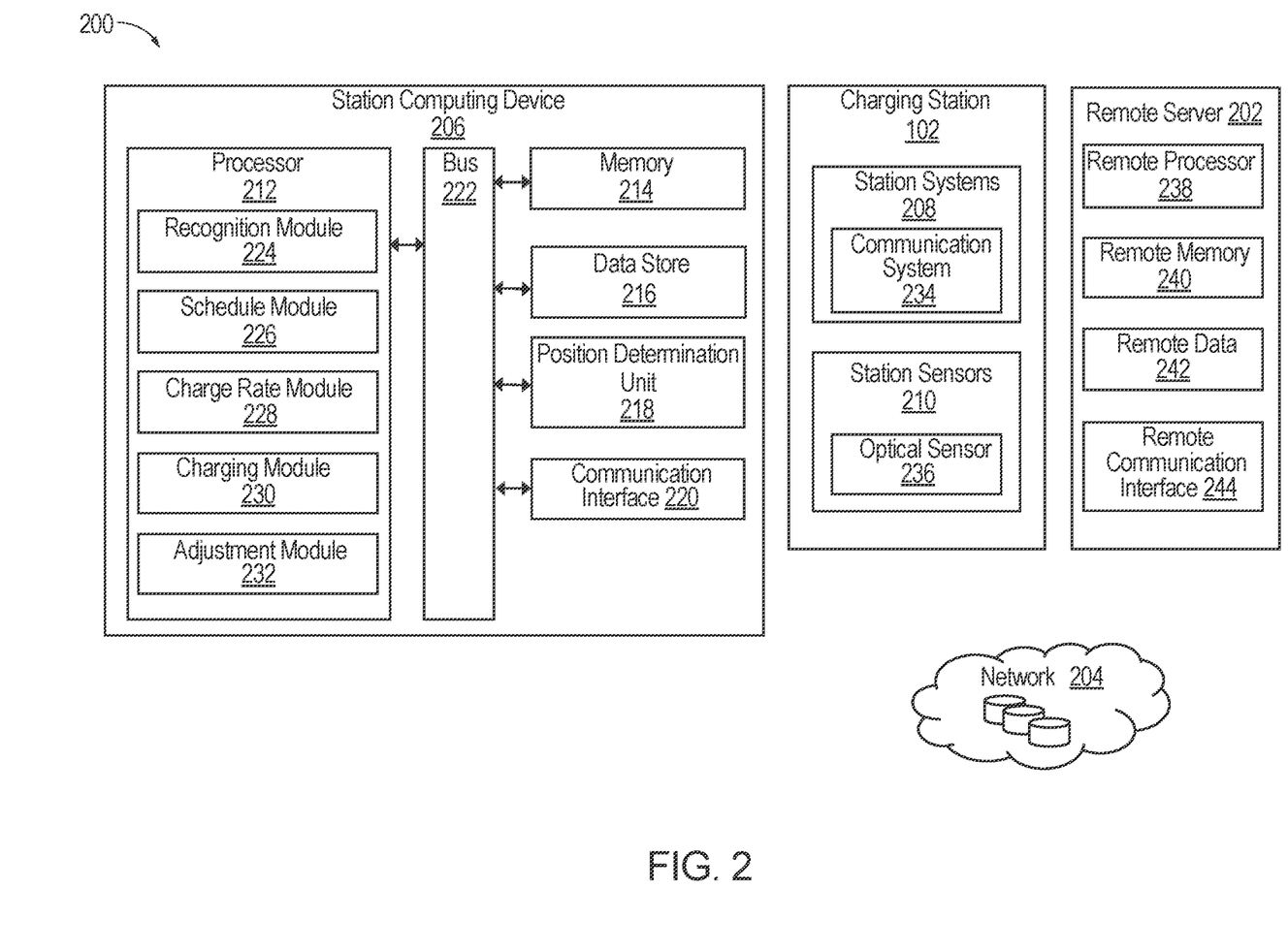
FIG. 2 is a block diagram of an operating environment for providing a personalized charging rate, according to an exemplary embodiment.

The user 108 and/or the vehicle 104 may access an operating environment 200, shown in FIG. 2, to receive charge for the vehicle 104 at a personalized charging rate. For example, the user 108 may transmit the schedule 112 for charging the vehicle 104 from the portable device 110 to the operating environment 200. In another embodiment, the schedule 112 may be transmitted from the vehicle 104.

FIG. 2, a block diagram of the operating environment 200 for providing a personalized charging rate according to an exemplary embodiment. One or more of the components of the operating environment 200 can be considered in whole or in part a vehicle communication network. The charging station 102 communicates with a remote server 202 over a network 204 and a station computing device (SCD) 206. The SCD 206 may be provided at the charging station 102, the remote server 202, or other remote location operably connected to the charging station 102 and/or the remote server 202 via the network 204. Station systems 208 and station sensors 210 communicate information about the charging station 102 or the physical environment (e.g., the parking area 100) of the charging station 102 to the SCD 206.

Generally, the SCD 206 includes a processor 212, a memory 214, a data store 216, a position determination unit 218, and a communication interface 220, which are each operably connected for computer communication via a bus 222 and/or other wired and wireless technologies defined herein. The SCD 206, can include provisions for processing, communicating, and interacting with various components of the charging station 102 and other components of the operating environment 200. As discussed above, the SCD 206 can be implemented with the charging station 102, for example, as part of a telematics unit, a head unit, an infotainment unit, an electronic control unit, an on-board unit, or as part of a specific control system, among others. In other embodiments, the SCD 206 can be implemented remotely from the charging station 102, for example, with a portable device 110 or the remote server 202, connected via the network 204.

The processor 212 can include logic circuitry with hardware, firmware, and software architecture frameworks for remote control of the charging station 102. Thus, in some embodiments, the processor 212 can store application frameworks, kernels, libraries, drivers, application program interfaces, among others, to execute and control hardware and functions discussed herein. For example, the processor 212 can include a recognition module 224, schedule module 226, a charge rate module 228, a charging module 230, and an adjustment module 232 although the processor 212 can be configured into other architectures. The memory 214 and/or the data store 216 may store data about the charging station 102. Further, in some embodiments, the memory 214 and/or the data store 216 can store similar components as the processor 212 for execution by the processor 212.

The modules of the processor 212 may access the position determination unit 218 via the bus 222. The position determination unit 218 can include hardware (e.g., sensors) and software to determine and/or acquire position data about the vehicle 104. For example, the position determination unit 218 can include a global positioning system (GPS) unit (not shown) and/or an inertial measurement unit (IMU) (not shown). Thus, the position determination unit 218 can provide a geo-position of the charging station 102 and/or the vehicle 104 based on satellite data from, for example, a global position source (not shown), or from any Global Navigational Satellite infrastructure (GNSS), including GPS, Glonass (Russian) and/or Galileo (European). Further, the position determination unit 218 can provide dead-reckoning data or motion data from, for example, a gyroscope, accelerometer, magnetometers, among others.

The communication interface 220 can include software and hardware to facilitate data input and output between the components of the SCD 206 and other components of the operating environment 200, the vehicle 104, and/or the portable device 110. Specifically, the communication interface 220 can include network interface controllers (not shown) and other hardware and software that manages and/or monitors connections and controls bi-directional data transfer between the communication interface 220 and other components of the operating environment 200, the charging station 102, the vehicle 104, and/or the portable device 110 using, for example, the network 204.

Referring again to the charging station 102, the station systems 208 can include any type of vehicle control system and/or vehicle described herein to enhance the charging station 102 and/or safety of the charging station 102. Here, the station systems 208 may include a communication system 234. The communication system 234 may facilitate communication from the charging station 102 and access the communication protocols of other entities. For example, when communicating with the vehicle 104, the communication system 234 may determine a media access control (MAC) address of the vehicle 104.

The station sensors 210, which can be implemented with the station systems 208, can include various types of sensors for use with the charging station 102 and/or the station systems 208 for detecting and/or sensing a parameter of the charging station 102, the station systems 208, charging information, and/or the environment surrounding the charging station 102. For example, the station sensors 210 can provide charging information about the current charge state of the charging station 102. The station sensors 210 can include, but are not limited to proximity sensors, vision sensors, motion sensors, environmental sensors, and charge sensors, among others. The station sensors 210 can be any type of sensor, for example, acoustic, electric, environmental, optical, imaging, light, pressure, force, moisture, thermal, temperature, proximity, among others.

Using the system and network configuration discussed above, the SCD 206 may determine a personalized charging rate for delivering charge the vehicle 104. In particular, the SCD 206 may manage the charging station 102, such that the SCD 206 sets the schedule, the charging rate, the type of charge provided, etc. for the charging station 102. For example, the charging station 102 may be operably connected for computer communication with the vehicle 104, additional electric vehicles (not shown), the SCD 206, and/or the remote server 202, for example, to transmit and receive data (e.g., charge parameters, charging data, feedback, vehicle system data, the schedule 112, a reservation interface, as will be discussed below) to and from the vehicle 104, any additional vehicles, the remote server 202 and/or the SCD 206. For example, the communication interface 220 and or the communication system 234 may be a wired or wireless link to the charging station 102. In one embodiment, the vehicle 104, additional vehicles, the charging station 102, the remote server 202 and/or the SCD 206 may be operably controlled to initiate or terminate charging of the vehicle 104 from the charging station 102 based on the systems and methods for providing a personalized charging rate as described herein.

In an exemplary embodiment, the vehicle 104, the charging station 102, any additional vehicles, and/or the remote server 202 may receive and transmit data through the network 204 to the SCD 206. The SCD 206 may include one or more computing devices (not shown) that may communicate with one or more charging station entities. Detailed embodiments describing exemplary methods using the system and network configuration discussed above will now be discussed in detail.

II. Methods for Providing a Personalized Charging Rate

Figure 3:
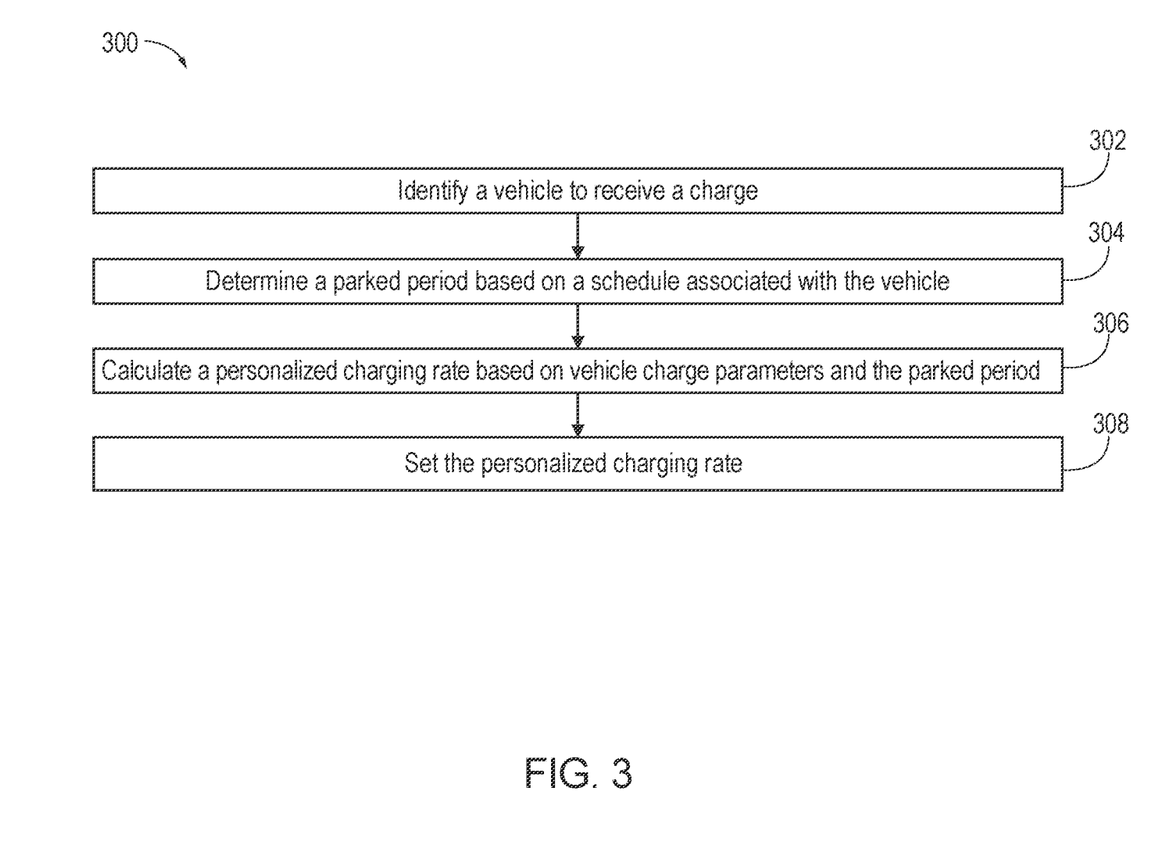
FIG. 3 is a process flow for providing a personalized charging rate, according to one embodiment.

Referring now to FIG. 3, a method 300 for providing a personalized charging rate is provided according to an exemplary embodiment. FIG. 3 will be described with reference to FIGS. 1 and 2. As shown in FIG. 3, the method 300 can be described by a number of steps. For simplicity, the method 300 will be described by these steps, but it is understood that the steps of the method 300 can be organized into different architectures, blocks, stages, and/or processes.

At block 302 the method 300 includes the recognition module 224 identifying the vehicle 104 to receive a charge. The recognition module 224 may recognize the vehicle 104 as being present at the charging station 102 or that the vehicle 104 has a reservation at the charging station 102. The recognition module 224 may recognize the vehicle 104 based on the proximity of the vehicle 104 to the charging station 102. The proximity may be based on communication between the charging station 102, the vehicle 104, the portable device 110, and/or the recognition module 224.

The recognition module 224 may also identify the vehicle 104 based on sensor data from the charging station 102. For example, the station systems 208 and/or the station sensors 210 may identify the vehicle 104. In one embodiment, an optical sensor 236 of the station sensors 210 may capture image data associated with the vehicle 104 or the charging station 102. The recognition module 224 may compare the image data to information about the vehicle 104. Accordingly, the recognition module 224 may identify the vehicle 104 based on characteristics (e.g., charging protocols, or voltage pattern). In another embodiment, the image data may be received from the remote server 202, the portable device 110, infrastructure from the parking area 100, roadside equipment (not shown) associated with the parking space 106, or from the vehicle 104.

The recognition module 224 may also identify the vehicle 104 based on an interaction with the charging station 102. In one embodiment, the interaction may be defined by the charging station 102 being electrically engaged with the vehicle 104, for example, via a cable or connector is physically engaged with an adapter (not shown) of the vehicle 104. Thus, the recognition module 224 may identify the vehicle 104 based on an electrical connection between the vehicle 104 and the charging station 102. In another embodiment, suppose the charging station 102 may provide inductive charging by using, for example, inductive charging plates. When the vehicle 104 is in position to receive a charge via the inductive charging plates, the station systems 208 may receive charging parameters via the communication system 234. The recognition module 224 may identify the vehicle 104 based on the charging parameters.

A number of charging parameters associated with the vehicle 104. The charging parameters may define the interactions of the vehicle 104 with other systems and objects, such as the station systems 208 of the charging station 102, the SCD 206, or the remote server 202. The charging parameters may include a predetermined SOC, charging protocols, voltage pattern, engagement protocols, authentication information, and/or vehicle data about the vehicle 104. The vehicle data may information about the vehicle 104 such characteristics including the vehicle identification number, color, make, model, etc. The vehicle data may also include historical data. The charging parameters may communicable to the systems and the objects. For example, the charging parameters may be communicated to the station systems 208 via the communication system 234 or the SCD 206 via the communication interface 220 and/or the network 204.

Returning to FIG. 3, at block 304 the method 300 includes the schedule module 226 determining a parked period when the vehicle 104 will be present at the charging station 102 based on a schedule 112 associated with the vehicle 104. The schedule 112 may be received from the charging station 102, the vehicle 104, the portable device 110, the remote server 202, and/or the SCD 206. The schedule 112 may include time information and location information that indicates how the vehicle 104 is used. For example, the portable device 110 may include the schedule 112 of the user 108. The schedule 112 may have a reservation for a dinner date at a time and an address for a restaurant. Accordingly, the vehicle 104 may be used to drive to the restaurant thereby indicating the probable location of the vehicle 104 at the given time. In this manner, the schedule 112 may be considered predictive of the behavior of the vehicle 104.

In another embodiment, the remote server 202 may maintain the schedule 112. The remote server 202 may receive schedule updates from the user 108. The remote processor 238 may then update the schedule 112 accordingly. The schedule 112 may be stored as remote data 242 on the remote server. Furthermore, the schedule 112 may be communicated with other components of the operating environment 200, such as the SCD 206, via the remote communication interface 244.

The schedule 112 may be received directly from the vehicle 104. For example, the vehicle 104 may access the portable device 110 or the remote server 202 to retrieve the schedule 112. In another embodiment, the schedule 112 may be maintained specifically for vehicle 104. Suppose that the vehicle is autonomously operated for hire, the schedule 112 may include origins, destinations, waypoints, pick-up time, and/or estimated arrival time. The vehicle 104 may be monitored, managed, and/or operated by a third party using the remote server 202. Accordingly, the schedule 112 may be stored in the remote memory 240.

The schedule 112 may be generated by virtue of a reservation interface of the schedule module 226. The reservation interface may be utilized by the user 108 to submit a reservation, appointment, meeting, etc. that would be included in the schedule 112. In some embodiments, the schedule 112 may include a proposed charging session that the user 108 selects for the vehicle 104. In another embodiment, the schedule 112 may include a map defining an area in which the user 108 would like to charge the vehicle 104. Accordingly, rather that identifying a specific place or charging station, the user 108 may select an area having one or more charging stations capable of charging the vehicle 104. The user 108 of the vehicle 104 may use a display (not shown) of the vehicle 104 and/or the portable device 110 as an input device for the reservation interface as one example of the parked period may be input from the user 108.

The parked period may be determined from the schedule 112. For example, the schedule 112 may indicate an arrival time and a departure time, such that the parked period is the difference between the arrival time and the departure time. In another embodiment, the schedule 112 may be based on historical data associated with the vehicle 104. For example, the vehicle data of the vehicle 104 may include historical data regarding one or more of the trips made by the vehicle 104. For example, the vehicle data may include the historical data, one or more trips, an origin the origin of a trip, the destination of a trip, the start time, the end time, the duration time of the trip, the dwell time of the vehicle 104 at a location, the mileage, the type of location, etc. Suppose that the vehicle 104 is driven to an Office Park on weekdays, arriving at approximately 8 AM and leaving at 5:30 PM. This pattern of behavior may be included in the schedule 112 based on the historical data. Accordingly, the schedule module 226 may determine the parked period of the vehicle 104 is approximately nine and half hours corresponding to the time between 8 AM and 5:30 PM. Thus, the parked period is determined based on the schedule 112 associated with the vehicle 104.

At block 306 the method 300 includes a charge rate module 228 calculating a personalized charging rate based on the vehicle charge parameters and the parked period. The charge rate defines a charge period that is an amount of time that the charging station 102 will provide charge to the vehicle 104 to increase a charge level of the vehicle 104 to a predetermined level. For example, the charge rate may be the speed with which a charge is delivered to the vehicle 104.

As discussed above, fast charging may enable the vehicle 104 to be charged at one or more charging speed tiers that provide a higher charging power (e.g., voltage, power, etc.) than a default charging speed tier or a slower charging speed tier. Suppose that the vehicle 104 can be charged at a higher charging speed tier that allows the vehicle 104 to receive a full charge in two hours. Then the higher charging speed tier has a charge period of two hours as that is the amount of time to charge the vehicle to a predetermined level (e.g., a full charge). Now suppose that the default charging speed tier would charge the vehicle in ten hours. Accordingly, the default charging speed tier has a charge period of ten hours.

Given the example from above where the parked period is determined to be nine and half hours. The charge period of the higher charging speed tier has a seven and half hour difference with the parked period whereas the charge period of the default speed charging tier has a half hour difference with the parked period. Thus, based on the absolute difference, the default charging speed tier may be selected as the personalized charging rate even though the higher charging speed tier would charge the vehicle 104 faster. In this manner, the personalized charging rate is calculated to reduce a time difference between the parked period and charge period. Although the higher charging speed tier and the default charging speed tier are discussed, more charging tiers may be available the charging speed tiers may include a first charging speed tier, a second charging speed tier, a third charging speed tier, and a fourth charging speed tier. While the first charging speed tier may correspond to a higher charging speed tier and the fourth charging speed tier may correspond to the default charging speed tier. Thus, the charge rate module 228 may calculate the personalized charging rate may be selected from a set of charging speed tiers. Accordingly, the charge rate module 228 may calculate the third charging speed tier as the personalized charging rate because the third charging speed tier reduces the time difference between the parked period and charge period.

In some embodiments, the charging parameters include a standard charge rate, and the charging rate module adjusts the standard charge rate to the personalized charging rate. For example, the charging parameters may indicate that the vehicle 104 is to be charged at the fastest charging speed tier available. Accordingly, the charge rate module 228 may adjust the fastest charging speed tier to the personalized charging rate which, from the example above, may be the default charging speed tier. Accordingly, the charging parameters may be used to identify charging protocols of the charging station 102 or the vehicle 104

The charge rate module 228 may determine time difference between the parked period and charge period without the charge period exceeding the parked period. In another embodiment, the charge rate module 228 may determine the time difference between the parked period and the charge period without the parked period exceeding the charge period. In some embodiments, the charge rate module 228 may calculate the personalized charging rate such that the parked period equals the charge period.

In another embodiment, the charge rate module 228 may calculate the personalized charging rate so that the charge period is within a threshold period of the parked period. For example, suppose that the threshold period is thirty minutes and the parked period is nine and half hours. The charge rate module 228 may calculate the personalized charging rate such that the charge period is at least nine hours.

Alternatively, the charge rate module 228 may calculate the personalized charging rate based on the charge level. For example, suppose that the charge level is a full charge. Continuing the example from above, the higher charging speed tier has a charge period of two hours, the default charging speed tier has a charge period of ten hours, and the parked period is nine and half hours. The default charging speed tier may be calculated as the personalized charging rate even though the vehicle 104 would not receive a full charge in the parked period. For example, the charge rate module 228 may calculate a personalized charging rate that would provide charge within a threshold level of the charge level desired by the user 108 or set by the vehicle 104. Suppose that the threshold level is a percentage value of the charge level such that the threshold level is 5% and the charge level is a 100%. The personalized charging rate may be calculated to supply the vehicle 104 with at least 95% of the charge level. Therefore, the default charging speed tier may be calculated as the personalized charging if in the nine and half hours of the parked period the vehicle 104 would receive at least 95% of the charge level.

At block 308 the method 300 includes the charging module 230 setting the personalized charging rate for the charging station 102. In another embodiment, the charge rate module 228 may calculate a personalized charging rate independently of specific charging speed tiers. Accordingly, the charging module 230 may set the charging station 102 to provide charge to the vehicle 104 at the calculated rate. Where the personalized charging rate is a charging speed tier, the charging module 230 may cause the charging station 102 to set the charging speed tier as the personalized charging rate or initialize charging at the charging speed tier.

In some embodiments, the vehicle 104 may control an amperage draw from the charging station 102. Accordingly, the charging module 230 may provide the personalized charging rate to the vehicle 104 to set the personalized charging rate. In another embodiment, the charging station 102 may provide a charge based on a specific amperage. Accordingly, the charging module 230 may provide the personalized charging rate to the charging station 102 to set the personalized charging rate.

Figure 4:
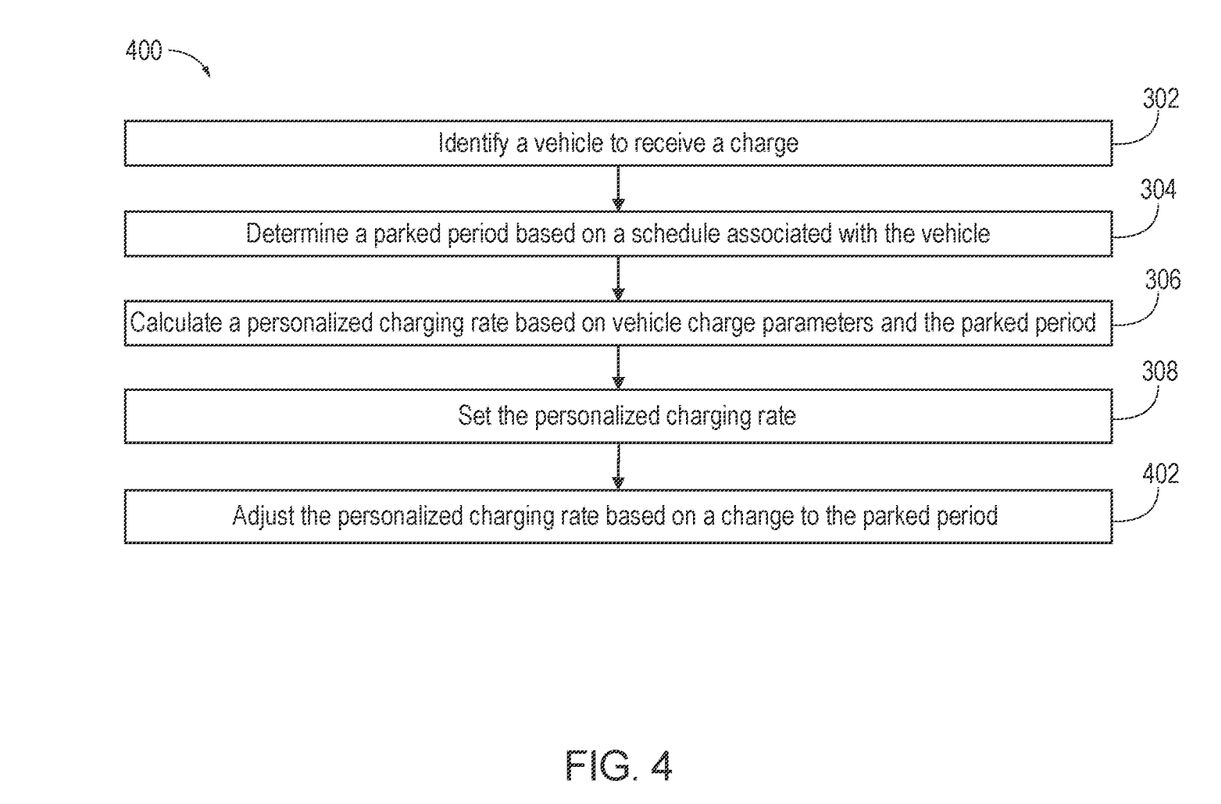
FIG. 4 is a process flow for adjusting a personalized charging rate, according to one embodiment.

Referring now to FIG. 4, a method 400 for providing a personalized charging rate that adjusts the personalized charging rate is provided according to an exemplary embodiment. FIG. 4 will be described with reference to FIGS. 1-3. As shown in FIG. 4, the method 400 can be described by a number of steps. For simplicity, the method 400 will be described by these steps, but it is understood that the steps of the method 400 can be organized into different architectures, blocks, stages, and/or processes.

In particular, the method 400 includes block 302, block 304, block 306, and block 308 that operate in a similar manner as described above with respect to the method 300 of FIG. 3 as discussed above. Additionally, the method 400 includes block 402. At block 402 the method includes the adjustment module 232 adjusting the personalized charging rate based on changes to the parking period. For example, the schedule module 226 may identify updates to the schedule 112. The schedule module 226 may iteratively receive the schedule 112 to determine the parked period. Suppose that the user 108 inputs an update to the schedule 112 by adding a meeting to the schedule 112 from 5:30 PM to 6:00 PM. In response to the change in the schedule 112, the schedule module 226 updates the parked period. In another embodiment, the schedule module 226 may receive the updated schedule in response to a change in the schedule 112. Accordingly, a change to the schedule 112 may prompt the source of the schedule 112 to provide the schedule 112 to the schedule module 226.

The charge rate module 228 may calculate an updated personalized charging rate based on the updated parked period. If the updated personalized charging rate is different than the personalized charging rate, the adjustment module 232 may adjust the personalized charging rate to the updated personalized charging rate. Consider the example from above in which the first charging speed tier corresponds to a higher charging speed tier with a charge period of two hours and the fourth charging speed tier corresponds to the default charging speed tier with a charge period of ten hours.

The charge rate module 228 calculates the third charging speed tier as the personalized charging rate because the third charging speed tier corresponding to the nine and half parked period. However, here the updated parked period is ten hours instead of nine and half. Accordingly, the adjustment module 232 may adjust the personalized charging rate to the fourth charging speed tier from the third charging speed tier. Thus, the personalized charging rate may be changed based on changes to the parked period.

Figure 5:
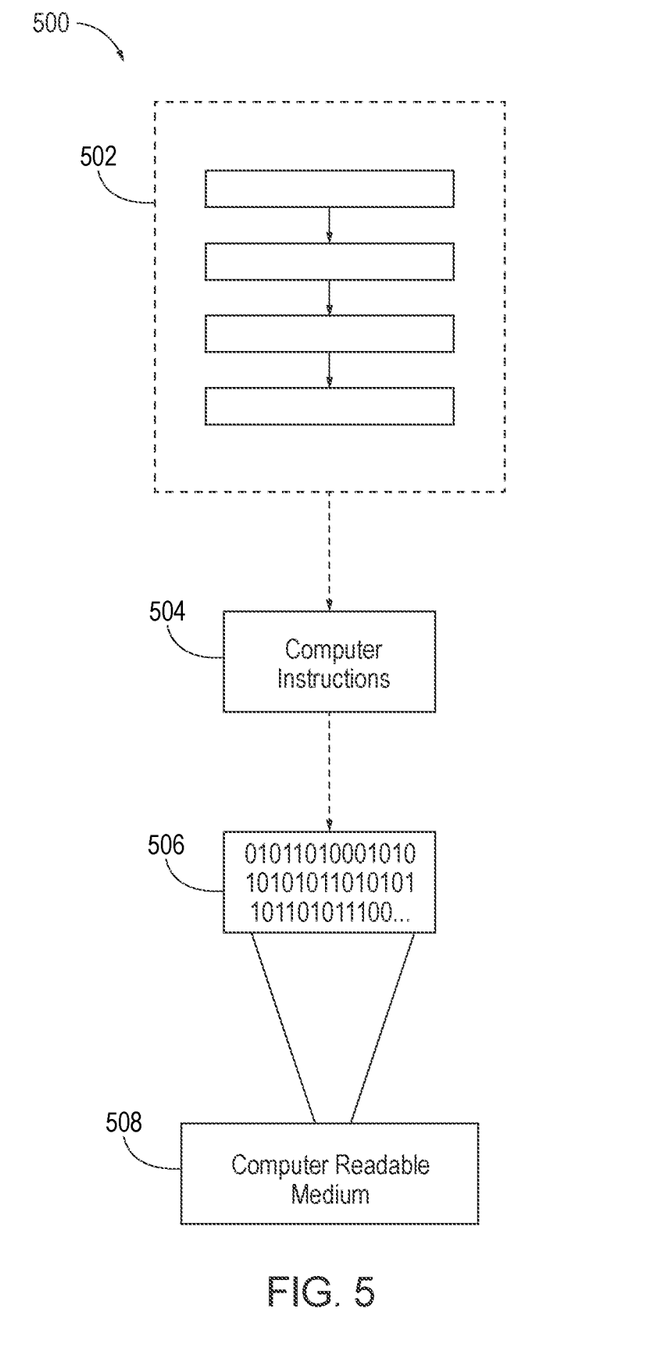
FIG. 5 is an illustration of an example computer-readable medium or computer-readable device including processor-executable instructions configured to embody one or more of the provisions set forth herein, according to one aspect.

Still another aspect of the systems and methods for charging station management involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 300 of FIG. 3 and the method 400 of FIG. 4. In another aspect, the processor-executable computer instructions 504 may be configured to implement a system, such as the operating environment of FIG. 2. Many such computer-readable media may be devised by those of ordinary skill in the art that are configured to operate in accordance with the techniques presented herein.

The term "computer readable media" as used herein includes computer storage media. Computer storage media includes volatile and nonvolatile, removable and non-removable media implemented in any method or technology for storage of information such as computer readable instructions or other data. Memory 214 and data store 216 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the SCD 206.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for providing a personalized charging rate, the system comprising a processor configured to:
   identify a vehicle to receive a charge, wherein a number of charging parameters are associated with the vehicle receiving a charge from a charging station;
   determine a parked period when the vehicle will be present at the charging station based on a schedule associated with the vehicle;
   calculate a personalized charging rate based on the charging parameters and the parked period, wherein the charge rate defines a charge period that is an amount of time that the charging station will provide charge to the vehicle to increase a charge level of the vehicle to a predetermined level, wherein the personalized charging rate is calculated to reduce a time difference between the parked period and the charge period until the charge period is within a threshold period of the parked period, and wherein the threshold period is calculated based on a length of the parked period before an idle penalty associated with the charging station is incurred; and
   set the personalized charging rate for the charging station.

2. The system for providing a personalized charging rate of claim 1, wherein the charging parameters include a standard charge rate, and wherein the processor adjusts the standard charge rate to the personalized charging rate.

3. The system for providing a personalized charging rate of claim 1, wherein the processor identifies the vehicle based on an electrical connection between the vehicle and the charging station.

4. The system for providing a personalized charging rate of claim 1, wherein the processor identifies the vehicle based on image data received from the charging station.

5. The system for providing a personalized charging rate of claim 1, wherein the parked period is based on historical data associated with the vehicle.

6. The system for providing a personalized charging rate of claim 1, wherein the parked period is input from a user of the vehicle.

7. A method for providing a personalized charging rate, the method comprising:
   identifying a vehicle to receive a charge, wherein a number of charging parameters are associated with the vehicle receiving a charge from a charging station;
   determining a parked period when the vehicle will be present at the charging station based on a schedule associated with the vehicle;
   calculating a personalized charging rate based on the charging parameters and the parked period, wherein the charge rate defines a charge period that is an amount of time that the charging station will provide charge to the vehicle to increase a charge level of the vehicle to a predetermined level, wherein the personalized charging rate is calculated to reduce a time difference between the parked period and the charge period until the charge period is within a threshold period of the parked period, and wherein the threshold period is calculated based on a length of the parked period before an idle penalty associated with the charging station is incurred; and
   setting the personalized charging rate.

8. The method for providing a personalized charging rate of claim 7, wherein the charging parameters include a standard charge rate, the method further comprising adjusting the standard charge rate to the personalized charging rate.

9. The method for providing a personalized charging rate of claim 7, wherein the vehicle is identified based on an electrical connection between the vehicle and the charging station.

10. The method for providing a personalized charging rate of claim 7, wherein the vehicle is identified based on image data received from the charging station.

11. The method for providing a personalized charging rate of claim 7, wherein the parked period is based on historical data associated with the vehicle.

12. The method for providing a personalized charging rate of claim 7, wherein the parked period is input from a user of the vehicle.

13. A non-transitory computer readable storage medium storing instructions that when executed by a computer, which includes a processor to perform a method for providing a personalized charging rate, the method comprising:
   identifying a vehicle to receive a charge, wherein a number of charging parameters associated with the vehicle receiving a charge from a charging station;
   determining a parked period when the vehicle will be present at the charging station based on a schedule associated with the vehicle;
   calculating a personalized charging rate based on the charging parameters and the parked period, wherein the charge rate defines a charge period that is an amount of time that the charging station will provide charge to the vehicle to increase a charge level of the vehicle to a predetermined level, wherein the personalized charging rate is calculated to reduce a time difference between the parked period and the charge period until the charge period is within a threshold period of the parked period, and wherein the threshold period is calculated based on a length of the parked period before an idle penalty associated with the charging station is incurred; and
   setting the personalized charging rate for the charging station.

14. The non-transitory computer readable storage medium of claim 13, wherein the charging parameters include a standard charge rate, the method further comprising adjusting the standard charge rate to the personalized charging rate.

* * * * *